(12) United States Patent
Kuo et al.

(10) Patent No.: US 11,214,668 B2
(45) Date of Patent: Jan. 4, 2022

(54) RESIN COMPOSITION FOR RESIN COMPOSITE, RESIN COMPOSITE, AND REFRIGERATION DEVICE COMPRISING THE SAID RESIN COMPOSITE

(71) Applicant: Chi Mei Corporation, Tainan (TW)

(72) Inventors: Hung-Jui Kuo, Tainan (TW); Jui-Hsi Hsu, Tainan (TW); Chen-Pao Huang, Tainan (TW)

(73) Assignee: CHIMEI CORPORATION, Tainan (TW)

( * ) Notice: Subject to any disclaimer, the term of this patent is extended or adjusted under 35 U.S.C. 154(b) by 189 days.

(21) Appl. No.: 16/583,396

(22) Filed: Sep. 26, 2019

(65) Prior Publication Data
US 2020/0123348 A1 Apr. 23, 2020

(30) Foreign Application Priority Data
Oct. 17, 2018 (TW) ................. 107136522

(51) Int. Cl.
| | | |
|---|---|---|
| *C08L 9/06* | (2006.01) | |
| *C08L 51/04* | (2006.01) | |
| *C08L 25/12* | (2006.01) | |
| *F25D 23/08* | (2006.01) | |
| *B32B 27/30* | (2006.01) | |
| *C08L 55/02* | (2006.01) | |
| *C08K 7/02* | (2006.01) | |
| *C08K 5/01* | (2006.01) | |

(52) U.S. Cl.
CPC .............. *C08L 9/06* (2013.01); *B32B 27/302* (2013.01); *C08L 25/12* (2013.01); *C08L 51/04* (2013.01); *C08L 55/02* (2013.01); *F25D 23/08* (2013.01); *B32B 2250/24* (2013.01); *C08K 5/01* (2013.01); *C08K 7/02* (2013.01); *C08K 2201/005* (2013.01)

(58) Field of Classification Search
CPC .. C08L 9/06; C08L 25/12; C08L 33/20; C08L 51/04; C08L 55/02; C08L 2205/02; C05L 2205/025; B32B 27/302; B32B 2250/24; F25D 23/08
See application file for complete search history.

(56) References Cited

U.S. PATENT DOCUMENTS

| | | | |
|---|---|---|---|
| 4,233,409 A * | 11/1980 | Bulkley | C08L 55/02 525/71 |
| 4,634,734 A | 1/1987 | Hambrecht et al. | |
| 5,430,100 A * | 7/1995 | Dotson | C08L 55/02 525/71 |
| 6,380,304 B1 | 4/2002 | Vanspeybroeck et al. | |
| 7,956,128 B2 * | 6/2011 | Park | C08L 51/04 525/71 |
| 2018/0086906 A1* | 3/2018 | Eim | C08L 25/12 |

FOREIGN PATENT DOCUMENTS

| | | | | |
|---|---|---|---|---|
| JP | H07509742 A | 10/1995 | | |
| WO | WO-2016123799 A1 * | 8/2016 | ........... | F25D 23/066 |

* cited by examiner

*Primary Examiner* — Nicholas E Hill
(74) *Attorney, Agent, or Firm* — Bacon & Thomas, PLLC (57) ABSTRACT

A resin composite is provided, which comprises: a first resin layer including a first rubber modified styrene-based resin composition; and a second resin layer including a second rubber modified styrene-based resin composition. The first and second rubber modified styrene-based resin compositions respectively comprise: a styrene-based copolymer; and rubber particles. In the first rubber modified styrene-based resin composition, on the basis of a total weight of all monomer units of the styrene-based copolymer being 100 wt %, the styrene-based copolymer comprises more than or equal to 21.0 wt % to less than or equal to 31.0 wt % of an acrylonitrile-based monomer unit. In the second rubber modified styrene-based resin composition, on the basis of a total weight of all monomer units of the styrene-based copolymer being 100 wt %, the styrene-based copolymer comprises more than or equal to 12.0 wt % to less than 21.0 wt % of an acrylonitrile-based monomer unit.

20 Claims, 2 Drawing Sheets

FIG. 3 ial Number 107136522, filed on Oct. 17, 2018, the subject matter of which is incorporated herein by reference.

RESIN COMPOSITION FOR RESIN COMPOSITE, RESIN COMPOSITE, AND REFRIGERATION DEVICE COMPRISING THE SAID RESIN COMPOSITE

CROSS REFERENCE TO RELATED APPLICATION

This application also claims the benefits of the Taiwan Patent Application Serial Number 107136522, filed on Oct. 17, 2018, the subject matter of which is incorporated herein by reference.

BACKGROUND

1. Field of the Disclosure

The present disclosure provides a resin composition for a resin composite, a resin composite, a composite plate, and a refrigeration device comprising the resin composite.

2. Description of Related Art

The box structure of a general refrigeration device includes an iron outer box, a PU foam insulation layer, and an inner liner. Among them, the inner liner is in contact with the food inside the refrigeration device, and the other side is in direct contact with a foaming agent. Therefore, the inner liner of the refrigeration device needs to have both high oil resistance and high corrosion resistance to the foaming agent. The inner liners currently used in refrigeration devices are mostly single-layer plate of High Impact Polystyrene (HIPS) or Acrylonitrile-Butadiene-Styrene Resin (ABS).

However, with the advancement of technology, the foaming agent of refrigeration device is diversified, and the corrosion resistance of HIPS and ABS is gradually being challenged. Based on environmental considerations such as reducing greenhouse gas emissions and reducing damage to the atmospheric ozone layer, among the newly developed foaming agents, cyclopentane and 1-chloro-3,3,3-trifluoropropene (LBA) are preferable. Although the currently used HIPS can withstand the corrosion of the new foaming agent (LBA), it has problems of poor glossiness and oil resistance. ABS with high glossiness and oil resistance has the problem of being unable to withstand the corrosion of the new foaming agent (LBA). Therefore, whether the single-layer plate of HIPS or ABS is used as the inner liner, due to the poor corrosion resistance or oil resistance, the inner liner is easily broken, thereby affecting the efficiency of the refrigeration device. Although it is possible to improve the corrosion resistance to the new foaming agent by increasing the thickness of the inner liner, it may cause problems in subsequent processing. In addition, even when ABS having a high glossiness and oil resistance as a surface layer and a HIPS having resistance to the new foaming agent (LBA) as a substrate layer are used as the inner liner, there are still problems about poor adhesion of the surface layer to the substrate layer and corrosion of cyclopentane foaming agent. When factories of refrigeration devices use cyclopentane and the new foaming agent (LBA) for the PU foaming process, it is necessary to switch the foaming production line for different materials of inner liner, which causes a complicated process.

Therefore, there is an urgent need to develop a new resin composite which can improve glossiness, oil resistance, adhesion and corrosion resistance to the foaming agent LBA without increasing the thickness.

SUMMARY

The present disclosure provides a resin composition for a resin composite, a resin composite, a composite plate, and a refrigeration device comprising the resin composite. Among these, the resin composite has high glossiness, high oil resistance, good adhesion and high corrosion resistance, and is used to reduce the risk of cracking.

The present disclosure provides a resin composite, comprising: a first resin layer, comprising a first rubber modified styrene-based resin composition; and a second resin layer, comprising a second rubber modified styrene-based resin composition, wherein the first rubber modified styrene-based resin composition comprises: a continuous phase formed with 86.0 wt % to 99.0 wt % of a first styrene-based copolymer; and a dispersed phase formed with 1.0 wt % to 14.0 wt % of first rubber particles, wherein on the basis of a total weight of all monomer units of the first styrene-based copolymer being 100 wt %, the first styrene-based copolymer comprises more than or equal to 21.0 wt % to less than or equal 20 to 31.0 wt % of a first acrylonitrile-based monomer unit, wherein the second rubber modified styrene-based resin composition comprises: a continuous phase formed with a second styrene-based copolymer; and a dispersed phase formed with second rubber particles, wherein on the basis of a total weight of all monomer units of the second styrene-based copolymer being 100 wt %, the second styrene-based copolymer comprises more than or equal to 12.0 wt % to less than 21.0 wt % of a second acrylonitrile-based monomer unit.

In an embodiment of the present disclosure, for example, the first rubber modified styrene-based resin composition comprises a continuous phase formed with 90.0 wt % to 97.0 wt % of the first styrene-based copolymer and a dispersed phase formed with 3.0 wt % to 10.0 wt % of the first rubber particles; preferably, the first rubber modified styrene-based resin composition comprises a continuous phase formed with 92.0 wt % to 97.0 wt % of the first styrene-based copolymer and a dispersed phase formed with 3.0 wt % to 8.0 wt % of the first rubber particles; more preferably, the first rubber modified styrene-based resin composition comprises a continuous phase formed with 92.5 wt % to 96.2 wt % of the first styrene-based copolymer and a dispersed phase formed with 3.8 wt % to 7.5 wt % of the first rubber particles, but the disclosure is not limited thereto.

In the present disclosure, the method for producing the first rubber modified styrene-based resin composition may be a grafting and kneading method. The grafting and kneading method is directly kneading a mixture of a rubber component (such as a rubber polymer or a rubber graft copolymer, preferably a rubber graft copolymer) and a styrene-based copolymer by a biaxial extruder, and then extruding and granulating the mixture to form a rubber modified styrene-based resin composition; wherein a lubricant may be added for kneading if needed.

In the present disclosure, the source of the first styrene-based copolymer may comprise a styrene-based copolymer grafted onto a rubber polymer, a styrene-based copolymer not grafted onto a rubber polymer, and a separately synthesized styrene-based copolymer.

In the present disclosure, the first styrene-based copolymer may be a styrene-acrylonitrile copolymer, but the disclosure is not limited thereto. In one embodiment of the present disclosure, on the basis of a total weight of all monomer units of the first styrene-based copolymer being 100 wt %, the first styrene-based copolymer may comprise 69.0 wt %0 to 79.0 wt % of a first styrene-based monomer unit, 21.0 wt % to 31.0 wt % of a first acrylonitrile-based monomer unit, and 0 wt % to 8.5 wt % of other copolymerizable vinyl-based monomer units. Here, the so-called monomer unit means a structural unit formed by copolymerization of a styrene-based monomer, an acrylonitrile-based monomer, or other copolymerizable vinyl-based monomers.

In the present disclosure, the first styrene-based monomer includes styrene, α-methylstyrene, 2-methylstyrene, 3-methylstyrene, 4-methylstyrene, ethyl styrene, 4-tert-butylstyrene, 2,4-dimethylstyrene, α-methyl-4-methylstyrene, 2-chlorostyrene, 4-chlorostyrene, bromostyrene, etc., but the disclosure is not limited thereto. The first acrylonitrile-based monomer includes acrylonitrile, α-methacrylonitrile, etc., but the disclosure is not limited thereto.

Other copolymerizable vinyl-based monomers include acrylic acid-based monomer, methacrylic acid-based monomer, acrylate-based monomer, or methacrylate-based monomer, but the disclosure is not limited thereto. The acrylic acid-based monomer includes, but is not limited to, acrylic acid. The methacrylic acid-based monomer includes, but is not limited to, methacrylic acid. The acrylate-based monomer comprises methyl acrylate, ethyl acrylate, isopropyl acrylate, or butyl acrylate, but the disclosure is not limited thereto. The methacrylate-based monomer comprises methyl methacrylate, ethyl methacrylate, propyl methacrylate, butyl methacrylate, hexyl methacrylate, cyclohexyl methacrylate, dodecyl methacrylate, benzyl methacrylate, or ethylene dimethacrylate, but the disclosure is not limited thereto.

In one embodiment of the present disclosure, on the basis of a total weight of all monomer units of the first styrene-based copolymer being 100 wt %, the first styrene-based copolymer comprises more than or equal to 21.0 wt % to less than or equal to 29.7 wt % of the first acrylonitrile-based monomer unit. For example, the first styrene-based copolymer comprises more than or equal to 22.0 wt % to less than or equal to 29.7 wt % of the first acrylonitrile-based monomer unit; preferably, the first styrene-based copolymer comprises more than or equal to 22.0 wt % to less than or equal to 29.0 wt % of the first acrylonitrile-based monomer unit; more preferably, the first styrene-based copolymer comprises more than or equal to 22.0 wt % to less than or equal to 28.0 wt % of the first acrylonitrile-based monomer unit, but the disclosure is not limited thereto. When the content of the first acrylonitrile-based monomer unit is within the above numerical range, the first resin layer of the resin composite has high oil resistance and good adhesion to the second resin layer, and does not easily peel off. In addition, the residual amount of the acrylonitrile-based monomer in the first acrylonitrile-based monomer unit of the first resin layer is less than 11 ppm, which is in compliance with the National Food Safety Standard GB of People's Republic of China.

In the present disclosure, the first styrene-based copolymer can be prepared by a solution polymerization method, a bulk polymerization method, an emulsion polymerization method, a suspension polymerization method, etc.; preferably a solution polymerization method or a bulk polymerization method. The reactor used in the polymerization may be one of a Continuous Stirred-Tank Reactor (CSTR), a Plug Flow Reactor (PFR), a Static Mixing Reactors, or a combination thereof. Taking the solution polymerization method as an example, in the present disclosure, the method for producing the first styrene-based copolymer can be obtained by solution polymerization of a monomer component containing a styrene-based monomer and an acrylonitrile-based monomer, but the disclosure is not limited thereto. In the present disclosure, the first styrene-based copolymer may be prepared by solution polymerization of a monomer component including a styrene-based monomer, an acrylonitrile-based monomer, and other copolymerizable vinyl-based monomers. In the present disclosure, the first styrene-based copolymer may also be prepared by solution polymerization of a monomer component including a styrene-based monomer and an acrylonitrile-based monomer, and selectively including additives such as a polymerization initiator, an activator, or a chain transfer agent.

In the present disclosure, the melt volume-flow rate (MVR) of the first styrene-based copolymer (test condition is 200° C.×10 kg) may be 10 ml/10 min to 50 ml/10 min; preferably, the first styrene-based copolymer has a melt volume-flow rate (MVR) of 11 ml/10 min to 40 ml/10 min; more preferably, the first styrene-based copolymer has a melt volume-flow rate (MVR) of 12 ml/10 min to 35 ml/10 min.

In the present disclosure, the source of the first rubber particles may comprise a rubber polymer and a rubber graft copolymer formed by grafting the rubber polymer. In the present disclosure, the first rubber modified styrene-based resin composition comprises a continuous phase formed with 86.0 wt % to 99.0 wt % of the first styrene-based copolymer; and a dispersed phase formed with 1.0 wt % to 14.0 wt % of the first rubber particles. Here, the so-called 1.0 wt % to 14.0 wt % of the first rubber particles are free of a grafted component, that is, comprises a rubber content only. More specifically, the rubber content of the first rubber modified styrene-based resin composition is 1.0 wt % to 14.0 wt %. When the content of the first rubber particles is within the above numerical range, the first resin layer of the resin composite has high glossiness, and good adhesion to the second resin layer, and does not easily peel off.

In the first rubber particles of the present disclosure, the rubber graft copolymer may be prepared by graft polymerization of a rubber polymer (solid content), a monomer component including a styrene-based monomer and an acrylonitrile-based monomer, and selectively including additives such as an emulsifier, a polymerization initiator, an activator, or a chain transfer agent. The graft polymerization may be a bulk, solution, suspension or emulsion polymerization. In the first rubber particles of the present disclosure, a preferred graft polymerization is an emulsion polymerization.

In the first rubber particles of the present disclosure, the rubber polymer may be diene-based rubber, polyacrylate-based rubber, or polysiloxane-based rubber, preferably a diene-based rubber, but the disclosure is not limited thereto. The diene-based rubber includes butadiene rubber, isoprene rubber, butadiene-isoprene rubber, butadiene-acrylonitrile rubber, ethylene-propylene rubber, styrene-butadiene rubber, styrene-isoprene rubber, preferably butadiene rubber, but the disclosure is not limited thereto. Among these, the butadiene rubber may be a butadiene rubber having a High-Cis content or a butadiene rubber having a Low-Cis content.

The method for producing the rubber graft copolymer by emulsion polymerization may be carried out in the presence of 2 parts by weight to 90 parts by weight (dry weight) of the diene-based rubber emulsion, and 10 parts by weight to 98 parts by weight of the monomer component. The graft polymerization reaction is carried out by a step of coagulation (with a coagulant), dehydration, drying, and the like. On the basis of the monomer component being 100 parts by weight, the monomer component may comprise 40 parts by weight to 90 parts by weight of the styrene-based monomer, 10 parts by weight to 60 parts by weight of the acrylonitrile-based monomer, and optionally 0 parts by weight to 40 parts by weight of other copolymerizable vinyl-based monomers that are selected based on needs. Rubber content of the rubber graft copolymer prepared by the emulsion polymerization above is, such as 25 wt % to 90 wt %, preferably 45 wt % to 80 wt %.

The diene-based rubber may be formed by polymerization of monomers directly into a weight average particle diameter of 0.05 μm to 0.8 μm, or into rubber emulsion of small particle diameters of 0.05 μm to 0.18 μm, followed by enlarging the rubber emulsion of small particle diameters of 0.05 μm to 0.18 μm into rubber emulsion of particle diameters of 0.2 μm to 0.8 μm by a conventional rubber enlargement method. The conventional rubber enlargement method may be a chemical enlargement method with adding an organic acid, a metal salt, or a polymer agglomerating agent containing a carboxylic acid group, a mechanical enlargement method of mechanical agitation, a freezing enlargement method, or the like, wherein the polymer agglomerating agent used in the chemical enlargement method may be butyl acrylate-methacrylic acid copolymer.

In the present disclosure, the emulsifier includes potassium laurate, potassium stearate, potassium oleate, sodium succinate, but the disclosure is not limited thereto. The polymerization initiator includes azobisisobutyronitrile (AIBN), benzoyl peroxide, cyclohexanone peroxide, cumene hydroperoxide, 1,1-bis-t-butyl peroxy cyclohexane, 1,1-bis-t-butyl peroxy-3,3,5-trimethylcyclohexane, potassium persulfate, but the disclosure is not limited thereto. The activator includes ferrous sulfate, formaldehyde sodium sulfoxylate, disodium edetate, tetrasodium pyrophosphate, but the disclosure is not limited thereto. The chain transfer agent includes n-dodecyl mercaptan (NDM), n-propyl mercaptan, t-dodecyl mercaptan (TDM), but the disclosure is not limited thereto. The coagulant includes acetic acid, sulfuric acid, sodium sulfate, potassium sulfate, calcium chloride, magnesium chloride, magnesium sulfate, aluminum sulfate, sodium bisulfite, potassium hydrogen sulfite, ammonium bisulfite, but the disclosure is not limited thereto.

In an embodiment of the present disclosure, the first rubber modified styrene-based resin composition is preferably an emulsion polymerized rubber modified styrene-based resin.

In an embodiment of the present disclosure, the second rubber modified styrene-based resin composition may comprise, for example, a continuous phase formed with 88.0 wt % to 94.0 wt % of a second styrene-based copolymer, and a dispersed phase formed with 6.0 wt % to 12.0 wt % of a second rubber particles; preferably, the second rubber modified styrene-based resin composition comprises the continuous phase formed with 89.0 wt % to 93.0 wt % of the second styrene-based copolymer, and the dispersed phase formed with 7.0 wt % to 11.0 wt % of the second rubber particles; more preferably, the second rubber modified styrene-based resin composition comprises the continuous phase formed with 90.0 wt % to 92.0 wt % of the second styrene-based copolymer, and the dispersed phase formed with 8.0 wt % to 10.0 wt % of the second rubber particles, but the disclosure is not limited thereto.

In the present disclosure, the method for producing the second rubber modified styrene-based resin composition may be a simultaneous grafting method, in which a rubber modified styrene-based resin composition is obtained by adding a rubber component (for example, a rubber polymer) to a polymerization reaction process of a styrene-based copolymer to participate in the polymerization reaction.

In the present disclosure, the source of the second styrene-based copolymer may include a styrene-based copolymer grafted onto a rubber polymer and a styrene-based copolymer not grafted onto a rubber polymer.

In the present disclosure, the second styrene-based copolymer may be a styrene-acrylonitrile copolymer, but the disclosure is not limited thereto. In one embodiment of the present disclosure, on the basis of a total weight of all monomer units of the second styrene-based copolymer being 100 wt %, the second styrene-based copolymer may comprise 79.5 wt % to 88.0 wt % of a second styrene-based monomer unit, 12.0 wt % to 20.5 wt % of a second acrylonitrile-based monomer unit, and 0 wt % to 8.5 wt % of other copolymerizable vinyl-based monomer units. Here, the so-called monomer unit means a structural unit formed by copolymerization of a styrene-based monomer, an acrylonitrile-based monomer, or other copolymerizable vinyl-based monomers.

The type of the constituent monomer of the second styrene-based copolymer may be the same as or different from that of the first styrene-based copolymer. The types of the second styrene-based monomer unit, the second acrylonitrile-based monomer unit, and the other copolymerizable vinyl-based monomer unit included in the second styrene-based copolymer are, for example, the same as those of exemplified for the first styrene-based copolymer, and are not described herein again.

In one embodiment of the present disclosure, on the basis of a total weight of all monomer units of the second styrene-based copolymer being 100 wt %, the second styrene-based copolymer comprises more than or equal to 12.0 wt % to less than or equal to 20.5 wt % of a second acrylonitrile-based monomer unit. For example, the second styrene-based copolymer comprises more than or equal to 12.5 wt % to less than or equal to 20.5 wt % of a second acrylonitrile-based monomer unit; preferably, the second styrene-based copolymer comprises more than or equal to 13.0 wt % to less than or equal to 20.0 wt % of a second acrylonitrile-based monomer unit; more preferably, the second styrene-based copolymer comprises more than or equal to 13.5 wt % to less than or equal to 19.5 wt % of a second acrylonitrile-based monomer unit, but the disclosure is not limited thereto. When the content of the second acrylonitrile-based monomer unit is within the above numerical range, the second resin layer of the resin composite has high corrosion resistance to the blowing agent cyclopentane and LBA and good adhesion to the first resin layer, and does not easily peel off.

In the present disclosure, the source of the second rubber particles may include a rubber polymer and a rubber graft copolymer formed by grafting the rubber polymer. In the present disclosure, the second rubber modified styrene-based resin composition may comprise a continuous phase formed with 88.0 wt % to 94.0 wt % of the second styrene-based copolymer, and a dispersed phase formed with 6.0 wt % to 12.0 wt % of the second rubber particles. Here, the so-called 6.0 wt % to 12.0 wt % of the second rubber particles are free of a grafted component, that is, comprises a rubber content only. More specifically, the rubber content of the second rubber modified styrene-based resin composition is 6.0 wt % to 12.0 wt %.

In the second rubber particles of the present disclosure, the rubber graft copolymer may be prepared by graft polymerization of a rubber polymer (solid content), a monomer component including a styrene-based monomer and an acrylonitrile-based monomer, and selectively including additives such as a polymerization initiator, a solvent, or a chain transfer agent. The graft polymerization may be a bulk or solution polymerization. In the second rubber particles of the present disclosure, a preferred graft polymerization is a bulk polymerization.

In the second rubber particles of the present disclosure, the rubber polymer may be diene-based rubber, polyacrylate-based rubber, or polysiloxane-based rubber, preferably is a diene-based rubber, but the disclosure is not limited thereto. The diene-based rubber includes butadiene rubber, isoprene rubber, butadiene-isoprene rubber, butadiene-acrylonitrile rubber, ethylene-propylene rubber, butadiene-styrene rubber, styrene-isoprene rubber, etc., preferably is butadiene rubber, but the disclosure is not limited thereto. The butadiene rubber may be a butadiene rubber having a High-Cis content or a butadiene rubber having a Low-Cis content. In the butadiene rubber having a High-Cis content, the typical weight composition of Cis/Vinyl is 94% to 98%/1% to 5%, and the rest of the composition is trans structure, in which Mooney viscosity is 20 to 120, and the range of weight average molecular weight is preferably 100,000 to 800,000. In the butadiene rubber having a Low-Cis content, the typical weight composition of Cis/Vinyl is 20% to 40%/1% to 20%, and the rest of the composition is a trans structure, in which Mooney viscosity is 20 to 120, and the range of weight average molecular weight is preferably 100,000 to 800,000. In the present disclosure, the butadiene rubber having a Low-Cis content is preferred, but the disclosure is not limited thereto.

The method for producing the rubber graft copolymer by bulk or solution polymerization includes, for example, dissolving in advance 2 parts by weight to 25 parts by weight of the diene-based rubber in 98 parts by weight to 75 parts by weight of the monomer component and a solvent that is selected based on needs. On the basis of the monomer component being 100 parts by weight, the monomer component may comprise 40 parts by weight to 90 parts by weight of the styrene-based monomer, 10 parts by weight to 60 parts by weight of the acrylonitrile-based monomer, and optionally 0 parts by weight to 40 parts by weight of other copolymerizable vinyl-based monomers. The resulting solution is then pumped into the reactor for graft polymerization, and an appropriate chain transfer agent, such as a t-dodecyl mercaptan, may be added during the reaction to control the molecular weight of the polymer. The reactor used may be a combination of a plurality of reactors connected in series or in parallel, preferably a kettle-shaped reactor with a powerful agitator. The solvent used may be toluene, xylene, ethylbenzene, methyl-ethyl ketone, ethyl acetate and the like.

The reactor is for example but not limited to Plug Flow Reactor (PFR), Continuous Stirred-Tank Reactor (CSTR), or Static Mixing Reactor. The number of the reactors may be one, or two or more, preferably three or more, in combination. The reactor may be operated at a temperature ranging from 80° C. to 200° C.; more preferably, the reactor is operated at a temperature ranging from 90° C. to 160° C. The operating pressure of the reactor may range from 1 kg/cm² to 5 kg/cm².

The rubber particles of the rubber graft copolymer obtained by the bulk or solution polymerization have a weight average particle diameter of generally 0.6 µm to 10 µm, preferably, 0.9 µm to 7 µm. The rubber graft copolymer obtained by the bulk or solution polymerization generally has a rubber content of 4 wt % to 25 wt %, preferably 8 wt % to 15 wt %.

In the present disclosure, the second rubber particles comprise rubber particles having an occlusion structure. The rubber particles having an occlusion structure are the ones in which one or a plurality of granular styrene-based copolymers are encapsulated inside the rubber particles. The styrene-based copolymer may comprise styrene-based monomer unit, acrylonitrile-based monomer unit, or other copolymerizable vinyl-based monomer units. The types of the styrene-based monomer, acrylonitrile-based monomer, and other copolymerizable vinyl-based monomer units are the same as those exemplified for the first styrene-based copolymer, and are not described herein again.

In an embodiment of the present disclosure, the weight average particle diameter of the second rubber particles may be more than 2.5 µm and less than 7.5 µm. For example, the weight average particle diameter of the second rubber particles is more than or equal to 3.0 µm and less than or equal to 7.0 µm; preferably, the weight average particle diameter of the second rubber particles is more than or equal to 3.0 µm and less than or equal to 6.0 µm; more preferably, the weight average particle diameter of the second rubber particles is more than or equal to 3.5 µm and less than or equal to 5.5 µm, but the disclosure is not limited thereto. When the weight average particle diameter of the second rubber particles is within the above numerical range, the second resin layer of the resin composite has high corrosion resistance to the blowing agent cyclopentane and LBA, and has good processing properties, such as Charpy impact strength, tensile strength, percentage of elongation.

In the method for producing the second rubber modified styrene-based resin composition of the present disclosure, the types of the polymerization initiator and the chain transfer agent are the same as those exemplified for the method for producing the first rubber modified styrene-based resin composition, and are not described herein again.

In an embodiment of the present disclosure, the second rubber modified styrene-based resin composition is preferably a bulk polymerized rubber modified styrene-based resin.

In one embodiment of the present disclosure, the difference between the content of the first acrylonitrile-based monomer unit in the first styrene-based copolymer and the content of the second acrylonitrile-based monomer unit in the second styrene-based copolymer is, for example, more than 0 wt % and less than or equal to 14 wt %; preferably, the difference between the content of the first acrylonitrile-based monomer unit and the content of the second acrylonitrile-based monomer unit is more than 0.5 wt % and less than or equal to 12 wt %; more preferably, the difference between the content of the first acrylonitrile-based monomer unit and the content of the second acrylonitrile-based monomer unit is more than 1 wt % and less than or equal to 11 wt %, but the disclosure is not limited thereto. In the present disclosure, the so-called the difference between the content of the first acrylonitrile-based monomer unit in the first styrene-based copolymer and the content of the second acrylonitrile-based monomer unit in the second styrene-based copolymer is further interpreted as the difference obtained by subtracting the content of the second acrylonitrile-based monomer unit in the second styrene-based copolymer from the content of the first acrylonitrile-based monomer unit in the first styrene-based copolymer. When the difference is within the above numerical range, the adhesion between the first resin layer and the second resin layer of the resin composite is good, and the layers do not easily peel off.

In the present disclosure, the first resin layer is obtained by co-extrusion of the first rubber modified styrene-based resin composition. The second resin layer is obtained by co-extrusion of the second rubber modified styrene-based resin composition. In addition, the resin composite can be co-extruded into a T shaped mold, a round shaped mold, and a mold with a hollow part inside, but the disclosure is not limited thereto. The condition of co-extrusion molding is that the first resin layer is extruded at a temperature of 210° C. to 250° C., and the second resin layer is extruded at a temperature of 180° C. to 225° C., but the disclosure is not limited thereto.

In the present disclosure, the thickness of the first resin layer is 2% to 5% of the thickness of the resin composite, and the thickness of the second resin layer is 95% to 98% of the thickness of the resin composite, which makes the resin composite low cost and have high oil resistance or high corrosion resistance. In one embodiment of the present disclosure, the resin composite has a thickness of 1.5 mm.

The present disclosure further provides a resin composition for a resin composite, comprising: 2.0 wt % to 5.0 wt % of a first rubber modified styrene-based resin composition; 95.0 wt % to 98.0 wt % of a second rubber modified styrene-based resin composition, wherein the first rubber modified styrene-based resin composition comprises: a continuous phase formed with 86.0 wt % to 99.0 wt % of a first styrene-based copolymer; and a dispersed phase formed with 1.0 wt % to 14.0 wt % of first rubber particles, wherein on the basis of a total weight of all monomer units of the first styrene-based copolymer being 100 wt %, the first styrene-based copolymer comprises more than or equal to 21.0 wt % to less than or equal to 31.0 wt % of a first acrylonitrile-based monomer unit, wherein the second rubber modified styrene-based resin composition comprises: a continuous phase formed with a second styrene-based copolymer; and a dispersed phase formed with second rubber particles, wherein on the basis of a total weight of all monomer units of the second styrene-based copolymer being 100 wt %, the second styrene-based copolymer comprises more than or equal to 12.0 wt % to less than 21.0 wt % of a second acrylonitrile-based monomer unit.

In the present disclosure, the first rubber-modified styrene-based resin composition is used to form a first resin layer, and the second rubber-modified styrene-based resin composition is used to form a second resin layer; more specifically, the first rubber-modified styrene-based resin composition is used to form the first resin layer of the resin composite, and the second rubber-modified styrene-based resin composition is used to form the second resin layer of the resin composite.

Here, the first rubber modified styrene-based resin composition and the second rubber modified styrene-based resin composition are as described above, and will not be described herein again.

The present disclosure provides an inner liner of a refrigeration device obtained by co-extruding and molding a resin composite as described above.

The present disclosure also provides a refrigeration device, comprising the resin composite as described above and a foamed layer, wherein the foamed layer is in contact with the second resin layer. Here, the refrigeration device includes a refrigerator, freezer, or freezer cabinet, but the disclosure is not limited thereto.

The disclosure also provides a composite plate comprising: a first resin plate, having a first surface and a first bonding surface; and a second resin plate, having a second surface and a second bonding surface, and the second bonding surface of the second resin plate and the first bonding surface of the first resin plate being overlapped with each other, wherein the first resin plate comprises a first rubber modified styrene-based resin composition, the first rubber modified styrene-based resin composition comprises: a continuous phase formed with 86.0 wt % to 99.0 wt % of a first styrene-based copolymer; a dispersed phase formed with 1.0 wt % to 14.0 wt % of first rubber particles, wherein on the basis of a total weight of all monomer units of the first styrene-based copolymer being 100 wt %, the first styrene-based copolymer comprises more than or equal to 21.0 wt % to less than or equal to 31.0 wt % of a first acrylonitrile-based monomer unit; the second resin plate comprises a second rubber modified styrene-based resin composition, and the second rubber modified styrene-based resin composition comprises: a continuous phase formed with a second styrene-based copolymer, and a dispersed phase formed with second rubber particles, wherein on the basis of a total weight of all monomer units of the second styrene-based copolymer being 100 wt %, the second styrene-based copolymer comprises more than or equal to 12.0 wt % to less than 21.0 wt % of a second acrylonitrile-based monomer unit.

The resin composite provided by the present disclosure is obtained by co-extruding the first resin layer and the second resin layer, that is, the first resin layer of the resin composite is formed by co-extruding the first rubber modified styrene-based resin composition in the resin composition, and the second resin layer of the resin composite is formed by co-extruding the second rubber modified styrene-based resin composition in the resin composition, wherein the content of the first rubber modified styrene-based resin composition in the resin composition is 2.0 wt % to 5.0 wt %, and the content of the second rubber modified styrene-based resin composition in the resin composition is 95.0 wt % to 98.0 wt %. Therefore, the resin composite has various properties, which are high oil resistance, high corrosion resistance, and high glossiness without increasing the thickness, so as to have an aesthetic appearance or reduce the risk of cracking.

DETAILED DESCRIPTION OF THE EMBODIMENTS

The embodiments of the present disclosure are described below by way of specific embodiments, and those skilled in the art can readily appreciate other advantages and effects of the disclosure. The disclosure may also be carried out or applied by various other specific embodiments. The details of the present specification can also be applied to various aspects and applications, and various modifications and changes can be made without departing from the spirit of the present disclosure.

<Analysis Methods>
Content of Monomer Unit

That is, the content ratio of the monomer units contained in the copolymer of the continuous phase is measured. The rubber-modified styrene-based resin was dissolved in tetrahydrofuran (THF) and pulled, and then tested by a Fourier-transform infrared spectrometer (FT-IR, manufactured by Nicolet Co., model Nexus 470).

Weight Average Molecular Weight

Gel Permeation Chromatography (GPC) manufactured by Waters Corporation, with a differential refractive index detector (Waters RI-2414) and an ultraviolet visible light detector (Waters PDA-2996) was used. The measurement conditions were as follows: column: MZ-Gel SDplus linear 5 μm, 300 mm×8.0 mm, mobile phase: tetrahydrofuran (THF), flow rate: 0.5 ml/min.

Weight Average Particle Diameter

Each of the rubber modified styrene-based resin was dyed with osmium tetroxide ($OsO_4$), and photos of the rubber particles (200 to 1,000) were taken by a transmission electron microscope at 10,000 magnification. The particle diameter (D, unit: μm) of each rubber particle was measured, and the average particle diameter (Davg) was determined according to the following formula:

$$\text{Average particle diameter } (Davg) = \frac{\sum_{j=1}^{m} N_i D_i^4}{\sum_{j=1}^{m} N_i D_i^3}$$

wherein Ni is the number of rubber particles having a particle diameter Di; Di is the particle diameter of the i-th rubber particle.

Oil Resistance

Figure 1:
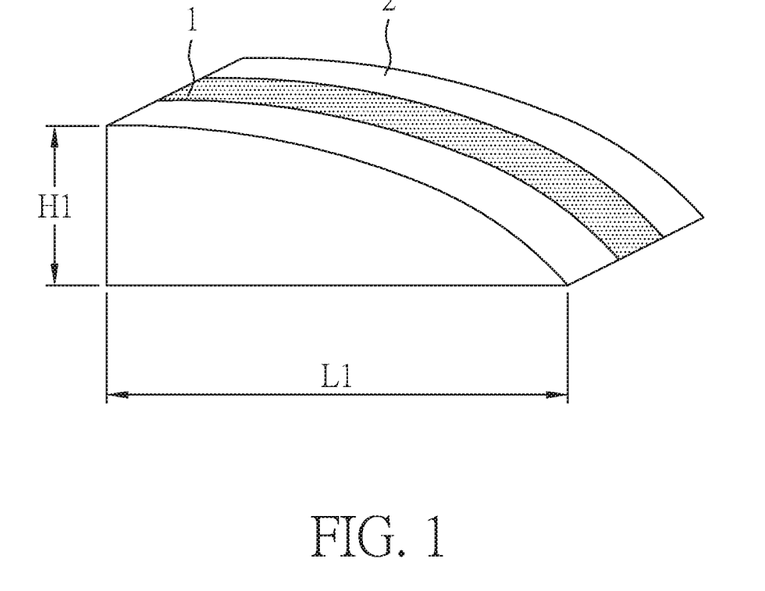
FIG. 1 is a schematic diagram of a quarter-elliptical jig for oil resistance testing.

A plate having a thickness of 1.5 mm is formed by an extruding method, and then cut into a test piece 1 of 230 mm×30 mm in the extrusion direction. The test piece 1 is fixed on the ¼ elliptical jig 2, and the specifications of the jig 2 are as shown in FIG. 1. The length L1 of the jig 2 is 190 mm, and the height H1 of the jig 2 is 70 mm.

Three (3) ml of soybean oil was evenly applied to the surface of the test piece 1, and then the test piece 1 was placed in a cabinet having a constant temperature and humidity. The test piece 1 was maintained at 70° C. for 12 hours, and then the temperature was lowered to −40° C. for 12 hours, which is 1 cycle. After the test piece 1 was maintained in the cabinet for a total of 4 cycles, the crack condition on the surface of the test piece 1 was evaluated by the following criteria:

○: Number of cracks≤3
    Δ: 3<Number of cracks≤5
    X: Number of cracks>5

Acrylonitrile (AN) Residual Monomer

The analysis was carried out using a gas chromatograph (manufactured by Agilent; Model: 7890) having a Flame Ionization Detector (FID), in ppm.

Glossiness

Measured according to ASTM D523, in %.

Adhesion

After the plate is coextruded, the entire sheet is cut by the blade in the transverse direction (TD) (perpendicular to the extrusion direction) on the side of the second resin layer, and at the cut surface, the side of the first resin layer was tested for peeling by hands with the following evaluation criteria:

○: No pieces can be peeled off.
    Δ: Only pieces of length≤5 mm can be peeled off.
    X: Strips of length>5 mm can be peeled off.

Melt Volume-Flow Rate (MVR)

The test was carried out in accordance with ISO 1133 at 200° C.×5 kg, unit: cm³/10 min. The test was carried out at 200° C.×10 kg, unit: ml/10 min.

Charpy Impact Strength Test (Notched)

A test sample having a size of 80 mm×10 mm and a thickness of 4 mm (the test piece has a V-shaped score) was prepared and measured according to the Charpy impact strength test method of ISO 179.

Tensile Strength (Tsy)

Tensile strength of the sample was determined according to the ISO 527 standard method, measured at a speed of 50 mm/min, in MPa.

Elongation Percentage (EL %)

Elongation percentage of the sample was measured by the ISO 527 standard method and expressed in %.

Test of Resistance for Foaming Agent

Figure 2:
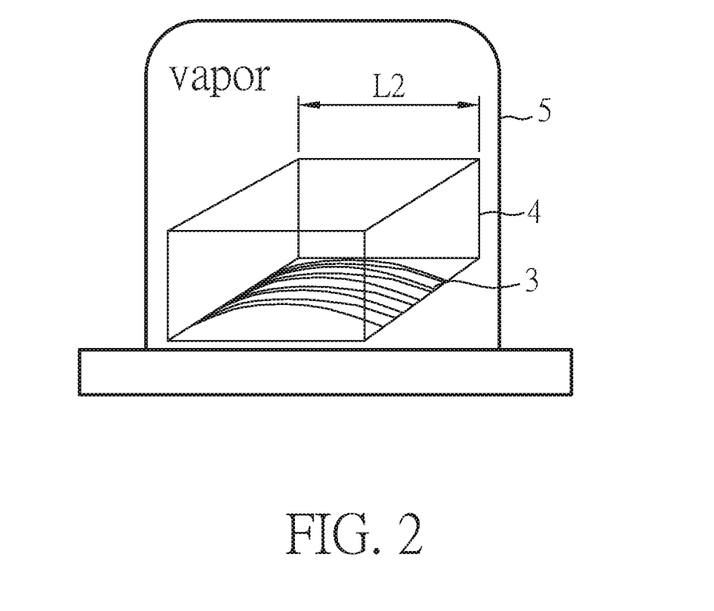
FIG. 2 is a schematic diagram of the resistance for foaming agents testing.

As shown in FIG. 2, test piece 3 (with thickness of 4.0 mm and length of 170 mm) for tensile test was manufactured according to ISO 527 and bent and fixed in a rectangular box jig 4 (length L2: 15 cm; width: 10 cm). Sixty grams (60 g) of the foaming agent was placed in an open container, and the test piece 3 and the rectangular box jig 4 were put in a pressure-resistant container 5. The pressure-resistant container 5 was sealed, and then heated to 50° C. for 12 hours. After the foaming agent was turned into vapors and filled with the inside of the pressure-resistant container 5, the temperature was cooled to −30° C. for 12 hours. After that, the test piece 3 was taken out, and the tensile strength (Tsy) and the elongation percentage (EL %) of the test piece 3 were measured, and the Tsy retention rate and EL retention rate were calculated. The vapors shown in FIG. 2 were vapors of a foaming agent, and the foaming agent used in the present disclosure was 1-chloro-3,3,3-trifluoropropene (LBA) and cyclopentane.

*Tsy* retention rate=(*Tsy* after test of resistance for foaming agent)/(*Tsy* before test of resistance for foaming agent)*1000%

*EL* retention rate=(*EL* after test of resistance for foaming agent)/(*EL* before test of resistance for foaming agent)*100%

The evaluation criteria for the test of resistance for foaming agent is as follows:

○: EL retention rate and Tsy retention rate are both≥70%
    X: Any retention rate<70%

<Materials>

HIPS: High Impact Polystyrene of Total S.A., trade name: Total 8265.

PR: Low cis butadiene rubber with a cis content of 35%.

EXAMPLES

Preparation of BP

The reaction of 150 parts by weight of 1,3-butadiene, 15 parts by weight of a 1 wt % potassium persulfate solution, 2 parts by weight of potassium oleate, 0.13 parts by weight of ethylene glycol dimethacrylate, and 190 parts by weight of distilled water was carried out at a reaction temperature of 65° C. for 14 hours, and a diene-based rubber emulsion having a weight average particle diameter of 0.1 μm, a conversion of about 94%, and a solid content of about 36% was obtained. In addition, the reaction of 90 parts by weight of n-butyl acrylate, 10 parts by weight of methacrylic acid, 0.5 parts by weight of a 1 wt % potassium persulfate solution, 0.5 parts by weight of a 10 wt % sodium dodecyl sulfate solution, 1 part by weight of n-dodecyl mercaptan, and 200 parts by weight of distilled water was carried out at a reaction temperature of 75° C. for 5 hours, and a carboxylic acid group-containing polymer agglomerating emulsion having a conversion rate of about 95% and a pH of about 6 was obtained. The process of enlargement of diene-based rubber emulsion was carried out with a dry weight of 3 parts by weight of a polymer agglomerating emulsion and 100 parts by weight of a diene-based rubber emulsion, and an enlarged rubber emulsion having a weight average particle diameter of about 0.3 μm and a pH of 8.5 was obtained. Grafting polymerization of the enlarged rubber emulsion with styrene and acrylonitrile was carried out by mixing a dry weight of 300 parts by weight of the enlarged rubber emulsion, 75 parts by weight of styrene, 25 parts by weight of acrylonitrile, 2 parts by weight of a t-dodecyl mercaptan, 3 parts by weight of cumene hydroperoxide, 3 parts by weight of a 0.2 wt % of ferrous sulfate solution, 0.9 parts by weight of a 10 wt % of sodium formaldehyde sulfoxylate solution, and 3 parts by weight of a 0.25 wt % of ethylenediaminetetraacetic acid solution. After that, the mixture was treated by calcium chloride coagulation and dehydration to be dried to less than 2%. The obtained rubber particles have a weight average particle diameter of about 0.31 μm and a rubber content of 75 wt %. On the basis of a total weight of the content of acrylonitrile-based monomer unit and the content of styrene-based monomer unit being 100 wt %, the rubber graft copolymer (BP) has an acrylonitrile-based monomer unit content of 25 wt % and a styrene-based monomer unit content of 75 wt %.

Preparation of SAN-1

82.5 parts by weight of styrene, 17.5 parts by weight of acrylonitrile, and 8 parts by weight of ethylbenzene were mixed, and the mixture was continuously added to a fully mixed continuous reactor at a flow rate of 35 kg/hr, in which the reactor has a volume of 40 liters, an internal temperature of 145° C., a pressure of 4 kg/cm$^2$, and an overall conversion rate of about 55%. After the completion of the polymerization, the obtained copolymer solution was heated by a preheater, and volatile substances such as unreacted monomers and solvents were removed in a vacuum degassing tank. Next, the obtained polymer melt was subjected to extrusion and granulation to obtain a styrene-acrylonitrile copolymer (SAN-1) having a melt volume-flow rate (MVR) of 32 ml/10 min, and 82 wt % of styrene monomer unit and 18 wt % of acrylonitrile monomer unit, on the basis of a total weight of the content of acrylonitrile monomer unit and the content of styrene monomer unit being 100 wt %.

Preparation of SAN-2

78.5 parts by weight of styrene, 21.5 parts by weight of acrylonitrile, and 8 parts by weight of ethylbenzene were mixed, and the mixture was continuously added to a fully mixed continuous reactor at a flow rate of 35 kg/hr, in which the reactor has a volume of 40 liters, an internal temperature of 145° C., a pressure of 4 kg/cm$^2$, and an overall conversion rate of about 55%. After the completion of the polymerization, the obtained copolymer solution was heated by a preheater, and volatile substances such as unreacted monomers and solvents were removed in a vacuum degassing tank. Next, the obtained polymer melt was subjected to extrusion and granulation to obtain a styrene-acrylonitrile copolymer (SAN-2) having a melt volume-flow rate (MVR) of 32 ml/10 min, and 78 wt % of styrene monomer unit and 22 wt % of acrylonitrile monomer unit, on the basis of a total weight of the content of acrylonitrile monomer unit and the content of styrene monomer unit being 100 wt %.

Preparation of SAN-3

55 parts by weight of styrene, 45 parts by weight of acrylonitrile, and 8 parts by weight of ethylbenzene were mixed, and the mixture was continuously added to a fully mixed continuous reactor at a flow rate of 35 kg/hr, in which the reactor has a volume of 40 liters, an internal temperature of 145° C., a pressure of 4 kg/cm$^2$, and an overall conversion rate of about 55%. After the completion of the polymerization, the obtained copolymer solution was heated by a preheater, and volatile substances such as unreacted monomers and solvents were removed in a vacuum degassing tank. Next, the obtained polymer melt was subjected to extrusion and granulation to obtain a styrene-acrylonitrile copolymer (SAN-3) having a melt volume-flow rate (MVR) of 12 ml/10 min, and 66 wt % of styrene monomer unit and 34 wt % of acrylonitrile monomer unit, on the basis of a total weight of the content of acrylonitrile monomer unit and the content of styrene monomer unit being 100 wt %.

Preparation of SAN-4

68 parts by weight of styrene, 32 parts by weight of acrylonitrile, and 8 parts by weight of ethylbenzene were mixed, and the mixture was continuously added to a fully mixed continuous reactor at a flow rate of 35 kg/hr, in which the reactor has a volume of 40 liters, an internal temperature of 140° C., a pressure of 4 kg/cm$^2$, and an overall conversion rate of about 55%. After the completion of the polymerization, the obtained copolymer solution was heated by a preheater, and volatile substances such as unreacted monomers and solvents were removed in a vacuum degassing tank to obtain a polymer melt. Next, the obtained polymer melt was plastic granulated by a biaxial extruder, in which the temperature was controlled at 230° C., and the pressure was 30 torr to obtain a styrene-acrylonitrile copolymer (SAN-4) having a melt volume-flow rate (MVR) of 30 ml/10 min, and 72 wt % of styrene monomer unit and 28 wt % of acrylonitrile monomer unit, on the basis of a total weight of the content of acrylonitrile monomer unit and the content of styrene monomer unit being 100 wt %.

Preparation of ABS

In a dry state, 19 parts by weight of BP, 81 parts by weight of SAN-4, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain an acrylonitrile-butadiene-styrene copolymer (ABS) having 14 wt % of rubber content and a rubber particle diameter of 0.31 μm, and 28 wt % of acrylonitrile monomer unit and 72 wt % of styrene monomer unit, on the basis of a total weight of the content of acrylonitrile monomer unit and the content of styrene monomer unit being 100 wt %.

Preparation of HIPS-1

8 parts by weight of low cis-butadiene rubber, 92 parts by weight of styrene, 10 parts by weight of ethylbenzene, and 300 ppm of dibenzoguanidine peroxide were introduced in the first reactor, in which the temperature was set at 99° C., for 1.5 hours of reaction. Then, the mixture was introduced into a second reactor, in which the temperature was set at 115° C., for 1.5 hours of reaction. Then, the mixture was introduced into a third reactor, in which the temperature was set at 130° C., for 1.5 hours of reaction. Finally, the mixture was introduced into a fourth reactor, in which the temperature was set at 160° C., for 1.5 hours of reaction. After the completion of the reaction, the unreacted component and the low volatile matter were removed by a devolatilizer to obtain a high impact polystyrene copolymer (HIPS-1) having a rubber content of 9 wt %.

First Rubber Modified Styrene-Based Resin Composition

Preparation Example 1-1

In the dry state, 95 parts by weight of SAN-2, 5 parts by weight of BP, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-2

In the dry state, 33 parts by weight of ABS, 67 parts by weight of SAN-2, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-3

In the dry state, 33 parts by weight of ABS, 20 parts by weight of SAN-2, 47 parts by weight of SAN-3, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-4

In the dry state, 75 parts by weight of SAN-2, 15 parts by weight of SAN-3, 10 parts by weight of BP, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-5

In the dry state, 95 parts by weight of SAN-1, 5 parts by weight of BP, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-6

In the dry state, 33 parts by weight of ABS, 67 parts by weight of SAN-3, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-7

In the dry state, 84 parts by weight of SAN-2, 15 parts by weight of SAN-3, 1 parts by weight of BP, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-8

In the dry state, 65 parts by weight of SAN-2, 15 parts by weight of SAN-3, 20 parts by weight of BP, and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

Preparation Example 1-9

In the dry state, 100 parts by weight of HIPS-1 and 2.0 parts by weight of a lubricant were kneaded, extruded and granulated at a kneading temperature of 220° C. in a biaxial extruder (model: ZPT-25, manufacturer: Zenix Industrial Co., Ltd.) to obtain the desired first rubber modified styrene-based resin composition.

The properties of the first rubber modified styrene-based resin composition obtained in Preparation Examples 1-1 to 1-9 are shown in Table 1.

Second Rubber Modified Styrene-Based Resin Composition

Preparation Example 2-1 to 2-8

Mixing the ingredients of Table 2 with 12 parts by weight of ethylbenzene and 0.1 part by weight of octadecyl 3,5-bis (1,1-dimethylethyl)-4-hydroxyphenylpropionate to obtain a mixture. Next, 100 parts by weight of styrene and 0.33 parts by weight of 1,1-bis-tert-butylperoxy-3,3,5-trimethylcyclohexane were added and mixed to form a polymerization initiator solution.

Then, the mixture was continuously supplied to the first reactor by a pump at a flow rate of 48 kg/hr, and the polymerization initiator solution was continuously supplied to the first reactor by a pump at a flow rate of 4 kg/hr, to carry out a reaction. The polymer solution obtained by the reaction is sequentially introduced into the second reactor, the third reactor and the fourth reactor to carry out reactions. The first, second, third, and fourth reactors described above were connected in series, and the reactors were all plug flow reactors having a capacity of 110 liters. The first reactor had a reaction temperature of 90° C. to 105° C. with a stirring speed of 40 rpm; the second reactor had a reaction temperature of 95° C. to 115° C. with a stirring speed of 40 rpm; the third reactor had a reaction temperature of 110° C. to 125° C. with a stirring speed of 10 rpm; the fourth reactor had a reaction temperature of 150° C. to 170° C. with a stirring speed of 3 rpm. The solid content of the final polymer was 80-85%. After the reaction was completed, the unreacted monomer and solvent are removed by a devolatilization device for recycling. After the final polymer was extruded through a die to form a strip, the strip was cooled and pelletized to obtain the second rubber modified styrene-based resin composition.

Acetone was mixed with the second rubber modified styrene-based resin composition, so that the rubber particles having the occlusion structure in the second rubber modified styrene-based resin composition were precipitated and filtered, and the portion which can be dissolved by acetone was measured for its weight average molecular weight by GPC. The calculated result showed that the second rubber modified styrene-based resin composition was composed of 91 wt % of an acrylonitrile-styrene copolymer and 9 wt % of rubber particles having an occlusion structure.

TABLE 1

| First Rubber Modified Styrene-Based Resin Composition | | Preparation Examples | | | | | | | | |
|---|---|---|---|---|---|---|---|---|---|---|
| | | 1-1 | 1-2 | 1-3 | 1-4 | 1-5 | 1-6 | 1-7 | 1-8 | 1-9 |
| Content of Matrix AN Monomer Unit[a] | wt % | 22.0 | 23.8 | 29.7 | 24.0 | 18.1 | 32.2 | 23.8 | 24.3 | 0.0 |
| Rubber Content | wt % | 3.8 | 4.6 | 4.6 | 7.5 | 3.8 | 4.6 | 0.8 | 15.0 | 9.0 |

[a]The total content of acrylonitrile monomer units in the composition on the basis of a total weight of the content of acrylonitrile monomer unit and the content of styrene monomer unit being 100 wt %.

TABLE 2

| Second Rubber Modified Styrene-Based Resin Composition | | 2-1 | 2-2 | 2-3 | 2-4 | 2-5 | 2-6 | 2-7 | 2-8 |
|---|---|---|---|---|---|---|---|---|---|
| Acrylonitrile | parts by weight | 9 | 11 | 16 | 11 | 8 | 19 | 11 | 11 |
| Styrene | parts by weight | 72 | 70 | 65 | 70 | 73 | 67 | 70 | 70 |
| Low cis butadiene rubber PR | parts by weight | 7 | 7 | 7 | 7 | 7 | 7 | 7 | 7 |
| N-dodecyl mercaptan | parts by weight | 0.033 | 0.048 | 0.048 | 0.06 | 0.06 | 0.033 | 0.033 | 0.07 |

The properties of the second rubber modified styrene-based resin composition obtained in Preparation Examples 2-1 to 2-8 are shown in Table 3.

TABLE 3

| Second Rubber Modified Styrene-Based Resin Composition | | 2-1 | 2-2 | 2-3 | 2-4 | 2-5 | 2-6 | 2-7 | 2-8 |
|---|---|---|---|---|---|---|---|---|---|
| Content of Matrix AN Monomer Unit[a] | wt % | 13.0 | 15.0 | 20.0 | 15.0 | 10.0 | 24.0 | 15.0 | 15.0 |
| Rubber particle diameter | μm | 4.4 | 4.0 | 5.3 | 5.0 | 5.5 | 5.2 | 2.5 | 7.5 |

[a] The total content of acrylonitrile monomer units in the composition on the basis of a total weight of the content of acrylonitrile monomer unit and the content of styrene monomer unit being 100 wt %.

Resin Composite 3 wt % of the first rubber modified styrene-based resin composition and 97 wt % of the second rubber modified styrene-based resin composition were co-extruded with a T die. The molding conditions for co-extrusion were as follows: the first rubber modified styrene-based resin composition had an extrusion temperature of 230° C., and the second rubber modified styrene-based resin composition had an extrusion temperature of 200° C. The total thickness of the resin composite was 1.5 mm, and the thickness of the first resin layer was 2% to 5% of the thickness of the resin composite.

Property Test of the First Resin Layer

The first rubber modified styrene-based resin compositions of Preparation Examples 1-1 to 1-4 were used for the first resin layers of Examples 1 to 4, respectively. The first rubber modified styrene-based resin compositions of Preparation Examples 1-5 to 1-9 were used for the first resin layers of Comparative Examples 1 to 5, respectively. For the second resin layers of Examples 1 to 4 and Comparative Examples 1 to 5, the second rubber modified styrene-based resin composition of Preparation Example 2-2 was used. The properties of the first resin layer were tested using the analytical methods described above, and the results are shown in Table 4.

TABLE 4

| Resin Composite | | | Example | | | | Comparative Example | | | | |
|---|---|---|---|---|---|---|---|---|---|---|---|
| | | | 1 | 2 | 3 | 4 | 1 | 2 | 3 | 4 | 5 |
| The First Resin Layer | | | Preparation Example 1-1 | Preparation Example 1-2 | Preparation Example 1-3 | Preparation Example 1-4 | Preparation Example 1-5 | Preparation Example 1-6 | Preparation Example 1-7 | Preparation Example 1-8 | Preparation Example 1-9 |
| The Second Resin Layer | | | Preparation Example 2-2 | Preparation Example 2-2 | Preparation Example 2-2 | Preparation Example 2-2 | Preparation Example 2-2 | Preparation Example 2-2 | Preparation Example 2-2 | Preparation Example 2-2 | Preparation Example 2-2 |
| The 1st Resin Layer | Content of Matrix AN Monomer Unit[a] | wt % | 22.0 | 23.8 | 29.7 | 24.0 | 18.1 | 32.2 | 23.8 | 24.3 | 0 |
| | Rubber content | wt % | 3.8 | 4.6 | 4.6 | 7.5 | 3.8 | 4.6 | 0.8 | 15.0 | 9.0 |
| | Oil Resistance | | Δ | ○ | ○ | ○ | x | ○ | ○ | ○ | x |
| | AN Residual Monomer | ppm | 3 | 5 | 9 | 5 | 2 | 20 | 6 | 5 | 0 |

TABLE 4-continued

|  |  |  | Example | | | | Comparative Example | | | | |
| --- | --- | --- | --- | --- | --- | --- | --- | --- | --- | --- | --- |
| Resin Composite | | | 1 | 2 | 3 | 4 | 1 | 2 | 3 | 4 | 5 |
|  | Glossiness | % | 98 | 97 | 96 | 93 | 98 | 97 | 99 | 85 | 85 |
| The 2nd Resin Layer | Content of Matrix AN Monomer Unit[a] | wt % | 15.0 | 15.0 | 15.0 | 15.0 | 15.0 | 15.0 | 15.0 | 15.0 | 15.0 |
|  | Rubber Particle Diameter | μm | 4.0 | 4.0 | 4.0 | 4.0 | 4.0 | 4.0 | 4.0 | 4.0 | 4.0 |
|  | Adhesion[b] |  | ○ | ○ | Δ | ○ | — | x | x | ○ | — |

[a]The total content of acrylonitrile monomer units in the composition on the basis of a total weight of the content of acrylonitrile monomer unit and the content of styrene monomer unit being 100 wt %.
[b]When the oil resistance is not good, the adhesion test is not performed.

It can be found from Table 4 that when the content of the acrylonitrile monomer unit of the first resin layer of Examples 1 to 4 is more than or equal to 21.0 wt % to less than or equal to 31.0 wt %, the first resin layer has good oil resistance, and the AN residual monomer is smaller than 20 ppm, which meets regulatory requirements, and has good adhesion to the second resin layer. In addition, when the rubber content of the first resin layers of Examples 1 to 4 is 1.0 wt % to 14.0 wt %, the first resin layer has good glossiness and good adhesion to the second resin layer.

Property Test of the Second Resin Layer

The first rubber modified styrene-based resin composition of Preparation Example 1-2 was used for the first resin layers of Examples 5 to 8 and Comparative Examples 6 to 10. The second rubber modified styrene-based resin compositions of Preparation Examples 2-1 to 2-4 were used for the second resin layers of Examples 5 to 8, respectively. The 20 second rubber modified styrene-based resin compositions of Preparation Examples 2-5 to 2-8 were used for the second resin layers of Comparative Examples 6 to 9, respectively. HIPS (Total 8265) was used for the second resin layer of Comparative Example 10. The properties of the second resin layer were tested using the analytical methods described above, and the results are shown in Table 5.

TABLE 5

|  |  |  | Example | | | | Comparative Example | | | | |
| --- | --- | --- | --- | --- | --- | --- | --- | --- | --- | --- | --- |
| Resin Composite | | | 5 | 6 | 7 | 8 | 6 | 7 | 8 | 9 | 10 |
| The First Resin Layer | | | Preparation Example 1-2 | Preparation Example 1-2 | Preparation Example 1-2 | Preparation Example 1-2 | Preparation Example 1-2 | Preparation Example 1-2 | Preparation Example 1-2 | Preparation Example 1-2 | Preparation Example 1-2 |
| The Second Resin Layer | | | Preparation Example 2-1 | Preparation Example 2-2 | Preparation Example 2-3 | Preparation Example 2-4 | Preparation Example 2-5 | Preparation Example 2-6 | Preparation Example 2-7 | Preparation Example 2-8 | HIPS |
| The 1st Resin Layer | Content of Matrix AN Monomer Unit[a] | wt % | 23.8 | 23.8 | 23.8 | 23.8 | 23.8 | 23.8 | 23.8 | 23.8 | 23.8 |
|  | Rubber content | wt % | 4.6 | 4.6 | 4.6 | 4.6 | 4.6 | 4.6 | 4.6 | 4.6 | 4.6 |
| The 2nd Resin Layer | Content of Matrix AN Monomer Unit[a] | wt % | 13.0 | 15.0 | 20.0 | 15.0 | 10.0 | 24.0 | 15.0 | 15.0 | 0 |
|  | Rubber Particle Diameter | μm | 4.4 | 4.0 | 5.3 | 5.0 | 5.5 | 5.2 | 2.5 | 7.5 | — |
|  | Rubber content | wt % | 9.0 | 9.0 | 9.0 | 9.0 | 9.0 | 9.0 | 9.0 | 9.0 | 10.0 |
|  | Melt Volume-Flow Rate (MVR) | cm³/10 min | — | 3.1 | — | 3.2 | — | — | 2.7 | 3.1 | 3.5 |
|  | Impact Strength (Charpy) | kJ/m² | — | 11.8 | — | 11.6 | — | — | 12.2 | 10.4 | 13 |
|  | Tensile Strength (Tsy V50) | MPa | — | 28.2 | — | 27.5 | — | — | 28.6 | 23.7 | 20 |
|  | Elongation percentage (EL_V50) | % | — | 82 | — | 82 | — | — | 84 | 79 | 70 |

TABLE 5-continued

|  | Example | | | | Comparative Example | | | | |
| --- | --- | --- | --- | --- | --- | --- | --- | --- | --- |
| Resin Composite | 5 | 6 | 7 | 8 | 6 | 7 | 8 | 9 | 10 |
| Resistance for LBA Foaming Agent | ○ | ○ | ○ | ○ | — | x | — | — | x |
| Resistance for Cyclopentane Foaming Agent | ○ | ○ | ○ | ○ | — | ○ | — | — | x |
| Adhesion[c] | ○ | ○ | ○ | ○ | x | ○ | — | — | — |

[a]The total content of acrylonitrile monomer units in the composition on the basis of a total weight of the content of acrylonitrile monomer unit and the content of styrene monomer unit being 100 wt %.
[c]When adhesion is not good, the test of corrosion resistance is not performed.

It can be found from Table 5 that when the content of the acrylonitrile monomer unit of the second resin layer of Examples 5 to 8 is more than or equal to 12.0 wt % to less than 21.0 wt %, the adhesion of the second resin layer to the first resin layer is good, and is resistant to LBA foaming agent. In addition, commonly used high impact polystyrene (HIPS) is not resistant to LBA foaming agent nor cyclopentane foaming agents.

Further, when the acrylonitrile monomer unit content of the second resin layer was 15 wt % and the rubber content was 9 wt %, the influence of the rubber particle diameter on the properties of the resin composite was analyzed. As shown in Table 5, when the rubber particle diameters of Examples 6 and 8 were larger than 2.5 μm and smaller than 7.5 μm, the obtained second resin layer had good melt volume-flow rate, Charpy impact strength, tensile strength, and elongation percentage, as well as resistance to LBA foaming agents.

Adhesion Test of the First Resin Layer and the Second Resin Layer

Adhesion tests of the following first resin layer and second resin layer were carried out by the analysis method described above, and the results are shown in Table 6. In that table, the first rubber modified styrene-based resin compositions of Preparation Examples 1-1 to 1-3 were used for the first resin layers (1) to (3), respectively. The second rubber modified styrene-based resin compositions of Preparation Examples 2-1 to 2-3 were used for the second resin layers (1) to (3), respectively.

TABLE 6

| Resin Composite | The First Resin Layer | | (1) | (2) | (3) |
| --- | --- | --- | --- | --- | --- |
| The Second Resin Layer | Content of Matrix AN Monomer Unit[a] (wt %) | | 22.0 | 23.8 | 29.7 |
| (1) | | 13 | ○ | ○ | Δ |
| (2) | | 15 | ○ | ○ | Δ |
| (3) | | 20 | ○ | ○ | ○ |

[a]The total content of acrylonitrile monomer units in the composition on the basis of a total weight of the content of acrylonitrile monomer unit and the content of styrene monomer unit being 100 wt %.

The present disclosure has unexpectedly found that when the difference between the content of the acrylonitrile monomer unit of the first resin layer and the content of the acrylonitrile monomer unit of the second resin layer is less than or equal to 14 wt %, the first resin layer and the second resin layer have good adhesion.

Composite Plate

Figure 3:
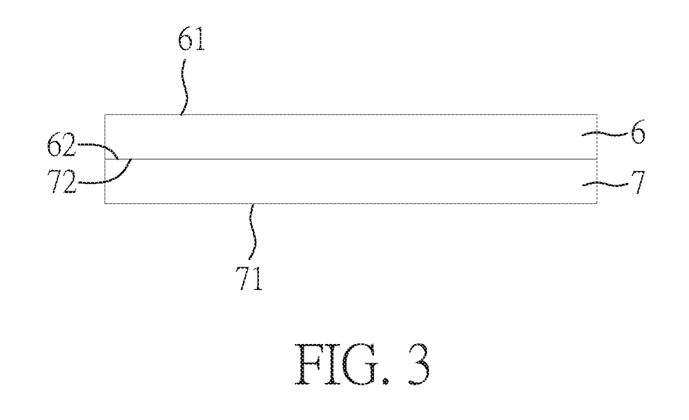
FIG. 3 is a schematic diagram of a composite plate according to an embodiment of the present disclosure.

FIG. 3 is a schematic view of a composite plate according to an embodiment of the present disclosure, wherein the composite plate is represented by a rectangle for convenience of explanation, but the disclosure is not limited thereto, and may be, for example, elliptical, trapezoidal or irregular. As shown in FIG. 3, the composite plate of the present disclosure comprises: a first resin plate 6 having a first surface 61 and a first bonding surface 62; a second resin plate 7 having a second surface 71 and a second bonding surface 72, wherein the second bonding surface 72 of the second resin plate 7 and the first bonding surface 62 of the first resin plate 6 are overlapped with each other. More specifically, the first surface 61 of the first resin plate 6 is disposed opposite to the first bonding surface 62, and the second surface 71 of the second resin plate 7 is disposed opposite to the second bonding surface 72. Since the second bonding surface 72 of the second resin plate 7 and the first bonding surface 62 of the first resin plate 6 overlap each other, the first surface 61 of the first resin plate 6 and the second surface 71 of the second resin plate 7 are disposed oppositely.

In the embodiment, the first resin plate 6 comprises a first rubber modified styrene-based resin composition, and the second resin plate 7 comprises a second rubber modified styrene-based resin composition, wherein the first rubber modified styrene-based resin composition and the second rubber-modified styrene-based resin composition are described above, and thus will not be described herein again. Since the first resin plate of the present embodiment comprises the first rubber modified styrene-based resin composition, and the second resin plate comprises the second rubber modified styrene-based resin composition, the composite plate has both oil resistance and corrosion resistance to the foaming agents.

An Inner Liner of a Refrigeration Device

The inner liner of the refrigeration device of the present disclosure is a composite plate obtained by co-extruding the above-mentioned resin composite. In the above resin composite, the first rubber modified styrene-based resin composition may be any one of Preparation Examples 1-1 to 1-4, and the second rubber modified styrene-based resin composition may be any one of Preparation Example 2-1 to 2-4.

The first rubber modified styrene-based resin composition of the present disclosure has the advantages of high glossiness and good oil resistance; the second rubber modified styrene-based resin composition has resistance to LBA foaming agent and cyclopentane foaming agent. Therefore, when the inner liner of the refrigeration device made of the resin composite of the present disclosure is in contact with an oily substance or a foaming agent, it is less likely to cause cracking of the inner liner.

A Refrigeration Device

The box structure of the refrigeration device of the present disclosure comprises an iron outer box, a foamed layer, and an inner liner, wherein the inner liner is a composite plate obtained by co-extruding the above-mentioned resin composite, and the foamed layer is in contact with the second resin layer. In the above resin composite, the first resin layer may be any one of Preparation Examples 1-1 to 1-4, and the second resin layer may be any one of Preparation Examples 2-1 to 2-4.

Since the first resin layer of the present disclosure has the advantages of high glossiness and good oil resistance, the first resin layer can be in contact with an oily substance such as food, and the inner liner is not easily broken. In addition, the second resin layer has the characteristics of resistance to foaming agents, so that the second resin layer can be in contact with the foamed layer, and the inner liner is not easily broken. Therefore, the durability of the refrigeration device of the present disclosure can be improved without increasing the thickness of the inner liner.

In summary, the resin composite provided by the present disclosure comprises a first resin layer having improved glossiness and oil resistance, and a second resin layer having corrosion resistance to LBA, as well as cyclopentane, and the first resin layer and the second resin layer have good adhesion. Therefore, the resin composite of the present disclosure can be applied to the inner liner of a refrigeration device to achieve an aesthetic appearance or a reduced risk of cracking without increasing the thickness.

What is claimed is:

1. A resin composition for a resin composite, comprising:
   2.0 wt % to 5.0 wt % of a first rubber modified styrene-based resin composition; and
   95.0 wt % to 98.0 wt % of a second rubber modified styrene-based resin composition,
   wherein the first rubber modified styrene-based resin composition comprises: a continuous phase formed with 86.0 wt % to 99.0 wt % of a first styrene-based copolymer; and a dispersed phase formed with 1.0 wt % to 14.0 wt % of first rubber particles, wherein on the basis of a total weight of all monomer units of the first styrene-based copolymer being 100 wt %, the first styrene-based copolymer comprises more than or equal to 21.0 wt % to less than or equal to 31.0 wt % of a first acrylonitrile-based monomer unit,
   wherein the second rubber modified styrene-based resin composition comprises: a continuous phase formed with a second styrene-based copolymer; and a dispersed phase formed with second rubber particles, wherein on the basis of a total weight of all monomer units of the second styrene-based copolymer being 100 wt %, the second styrene-based copolymer comprises more than or equal to 12.0 wt % to less than 21.0 wt % of a second acrylonitrile-based monomer unit.

2. The resin composition for a resin composite according to claim 1, wherein the first rubber modified styrene-based resin composition comprises: the continuous phase formed with 90.0 wt % to 97.0 wt % of the first styrene-based copolymer; and the dispersed phase formed with 3.0 wt % to 10.0 wt % of the first rubber particles.

3. The resin composition for a resin composite according to claim 1, wherein the first styrene-based copolymer comprises more than or equal to 22.0 wt % to less than or equal to 29.7 wt % of the first acrylonitrile-based monomer unit.

4. The resin composition for a resin composite according to claim 1, wherein the second styrene-based copolymer comprises more than or equal to 12.5 wt % to less than 20.5 wt % of the second acrylonitrile-based monomer unit.

5. The resin composition for a resin composite according to claim 1, wherein the weight average particle diameter of the second rubber particles is more than 2.5 μm to less than 7.5 μm.

6. The resin composition for a resin composite according to claim 5, wherein the weight average particle diameter of the second rubber particles is more than or equal to 3.0 μm to less than or equal to 7.0 μm.

7. The resin composition for a resin composite according to claim 1, wherein the second rubber modified styrene-based resin composition is a bulk polymerized rubber modified styrene-based resin, and the second rubber particles comprise rubber particles having an occlusion structure.

8. The resin composition for a resin composite according to claim 1, wherein a difference between a content of the first acrylonitrile-based monomer unit and a content of the second acrylonitrile-based monomer unit is less than or equal to 14 wt %.

9. A resin composite, comprising:
   a first resin layer, comprising a first rubber modified styrene-based resin composition; and
   a second resin layer, comprising a second rubber modified styrene-based resin composition,
   wherein the first rubber modified styrene-based resin composition comprises: a continuous phase formed with 86.0 wt % to 99.0 wt % of a first styrene-based copolymer; and a dispersed phase formed with 1.0 wt % to 14.0 wt % of first rubber particles, wherein on the basis of a total weight of all monomer units of the first styrene-based copolymer being 100 wt %, the first styrene-based copolymer comprises more than or equal to 21.0 wt % to less than or equal to 31.0 wt % of a first acrylonitrile-based monomer unit,
   wherein the second rubber modified styrene-based resin composition comprises: a continuous phase formed with a second styrene-based copolymer; and a dispersed phase formed with second rubber particles, wherein on the basis of a total weight of all monomer units of the second styrene-based copolymer being 100 wt %, the second styrene-based copolymer comprises more than or equal to 12.0 wt % to less than 21.0 wt % of a second acrylonitrile-based monomer unit.

10. The resin composite according to claim 9, wherein the first rubber modified styrene-based resin composition comprises: the continuous phase formed with 90.0 wt % to 97.0 wt % of the first styrene-based copolymer; and the dispersed phase formed with 3.0 wt % to 10.0 wt % of the first rubber particles.

11. The resin composite according to claim 9, wherein the first styrene-based copolymer comprises more than or equal to 22.0 wt % to less than or equal to 29.7 wt % of the first acrylonitrile-based monomer unit.

12. The resin composite according to claim 9, wherein the second styrene-based copolymer comprises more than or equal to 12.5 wt % to less than 20.5 wt % of the second acrylonitrile-based monomer unit.

13. The resin composite according to claim 9, wherein the weight average particle diameter of the second rubber particles is more than 2.5 μm to less than 7.5 μm.

14. The resin composite according to claim 13, wherein the weight average particle diameter of the second rubber particles is more than or equal to 3.0 μm to less than or equal to 7.0 μm.

15. The resin composite according to claim 9, wherein the second rubber modified styrene-based resin composition is a bulk polymerized rubber modified styrene-based resin, and the second rubber particles comprise rubber particles having an occlusion structure.

16. The resin composite according to claim 9, wherein the thickness of the first resin layer is 2% to 5% of the thickness of the resin composite, and the thickness of the second resin layer is 95% to 98% of the thickness of the resin composite.

17. The resin composite according to claim 9, wherein a difference between a content of the first acrylonitrile-based monomer unit and a content of the second acrylonitrile-based monomer unit is less than or equal to 14 wt %.

18. The resin composite according to claim 9, wherein the first resin layer is formed by co-extruding the first rubber modified styrene-based resin composition, and the second resin layer is formed by co-extruding the second rubber modified styrene-based resin composition.

19. A refrigeration device, comprising:
   a resin composite according to claim 9; and
   a foamed layer, wherein the foamed layer is in contact with the second resin layer.

20. The refrigeration device according to claim 19, wherein the refrigeration device is a refrigerator or a freezer.

* * * * *